US008274042B2

(12) United States Patent
Holle

(10) Patent No.: US 8,274,042 B2
(45) Date of Patent: Sep. 25, 2012

(54) IMAGING MASS SPECTROMETRY FOR SMALL MOLECULES IN TWO-DIMENSIONAL SAMPLES

(75) Inventor: Armin Holle, Achim (DE)

(73) Assignee: Bruker Daltonik GmbH, Bremen (DE)

( * ) Notice: Subject to any disclaimer, the term of this patent is extended or adjusted under 35 U.S.C. 154(b) by 255 days.

(21) Appl. No.: 12/128,276

(22) Filed: May 28, 2008

(65) Prior Publication Data

US 2008/0296488 A1 Dec. 4, 2008

(30) Foreign Application Priority Data

May 29, 2007 (DE) ........................ 10 2007 024 857

(51) Int. Cl.
*B01D 59/44* (2006.01)
*H01J 49/00* (2006.01)

(52) U.S. Cl. ........................ 250/282; 250/287; 250/288

(58) Field of Classification Search .................. 250/281, 250/282, 287, 288

See application file for complete search history.

(56) References Cited

U.S. PATENT DOCUMENTS

| | | | | |
|---|---|---|---|---|
| 4,733,073 | A * | 3/1988 | Becker et al. | 250/288 |
| 5,627,369 | A | 5/1997 | Vestal et al. | 250/287 |
| 5,821,534 | A * | 10/1998 | Park | 250/287 |
| 6,300,627 | B1 | 10/2001 | Koster et al. | 250/287 |
| 6,441,369 | B1 * | 8/2002 | Vestal et al. | 250/287 |
| 6,534,764 | B1 * | 3/2003 | Verentchikov et al. | 250/287 |
| 6,703,608 | B2 | 3/2004 | Holle et al. | 250/287 |
| 6,723,983 | B2 * | 4/2004 | Holle | 250/287 |
| 6,740,872 | B1 | 5/2004 | Holle | 250/281 |
| 7,235,781 | B2 | 6/2007 | Haase et al. | 250/288 |
| 7,365,317 | B2 * | 4/2008 | Whitehouse et al. | 250/292 |
| 2002/0117616 | A1 * | 8/2002 | Vestal | 250/287 |
| 2003/0089848 | A1 * | 5/2003 | Holle et al. | 250/282 |
| 2004/0206900 | A1 * | 10/2004 | Cornish et al. | 250/287 |
| 2005/0092916 | A1 * | 5/2005 | Vestal et al. | 250/288 |

(Continued)

FOREIGN PATENT DOCUMENTS

WO WO 2007/007192 1/2007

OTHER PUBLICATIONS

Reyzer et al. "Direct analysis of drug candidates in tissue by matrix-assisted laser desorption/ionization mass spectrometry" Journal of Mass Spectrometry, 2003; 38:1081-1092.*

*Primary Examiner* — Phillip A Johnston
*Assistant Examiner* — Brooke Purinton
(74) *Attorney, Agent, or Firm* — O'Shea Getz P.C.

(57) ABSTRACT

The invention relates to spatially resolved mass spectrometric measurement and visualization of the distribution of small molecules in a mass range from approximately 150 to 500 Daltons, for example drugs and their metabolites, in thin sections or other two-dimensional samples, preferably with ionization of the molecules by matrix-assisted laser desorption. The invention includes the steps measuring a daughter ion produced by forced decomposition of the molecular ion instead of the ionized analyte molecule itself, the daughter ion having a much better signal-to-noise ratio. The daughter ions are detected in a relatively simple reflector time-of-flight mass spectrometer instead of using an expensive time-of-flight tandem mass spectrometers for the measurement of the daughter ions. Advantageously, substantially faster and less expensive scanning of the thousands of mass spectra which serve as the basis for visualizing the spatial distribution of the analyte molecule is achieved, while the mass resolution and sensitivity are at least equally good.

19 Claims, 1 Drawing Sheet

U.S. PATENT DOCUMENTS

| | | | | |
|---|---|---|---|---|
| 2006/0063145 | A1 | 3/2006 | Suckau et al. | 435/4 |
| 2007/0114387 | A1 * | 5/2007 | Chang et al. | 250/288 |
| 2007/0138385 | A1 * | 6/2007 | Kulp et al. | 250/282 |
| 2008/0021687 | A1 * | 1/2008 | Hunter et al. | 703/11 |
| 2008/0203289 | A1 | 8/2008 | Lemaire | |
| 2009/0001262 | A1 * | 1/2009 | Visser et al. | 250/282 |
| 2010/0116981 | A1 * | 5/2010 | Kajihara | 250/282 |
| 2010/0237238 | A1 * | 9/2010 | Franzen | 250/283 |

* cited by examiner

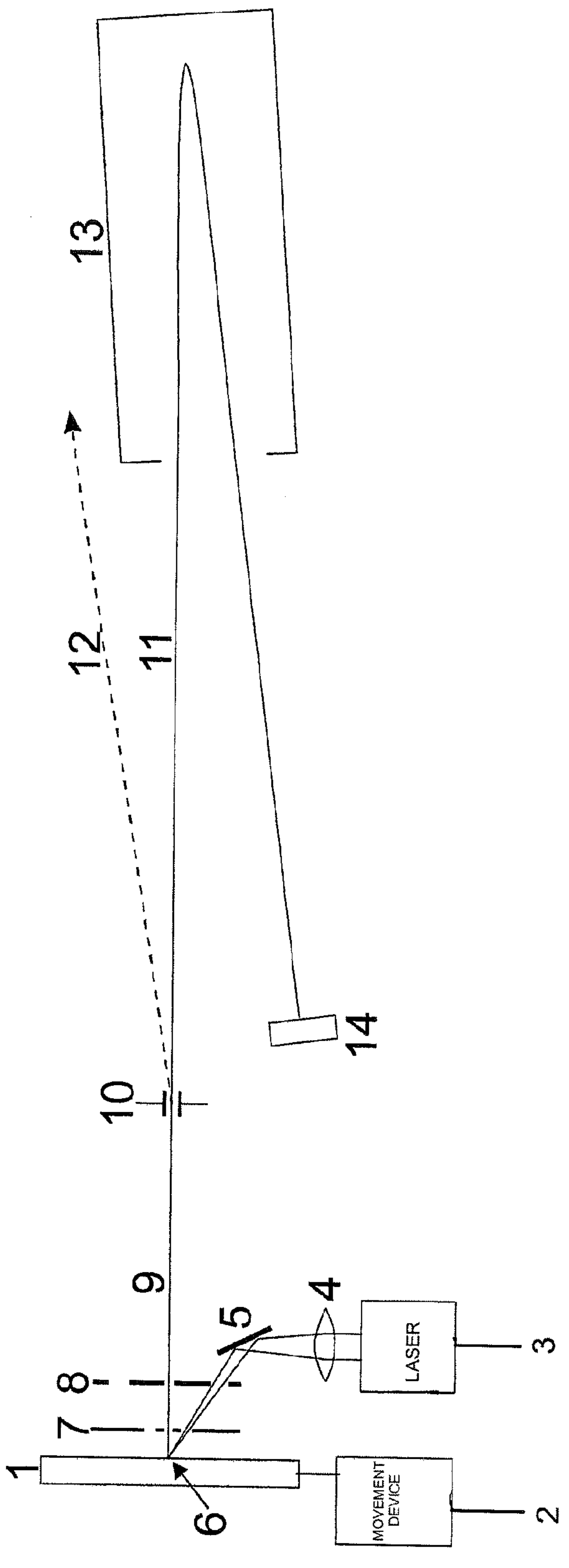
LASER
MOVEMENT DEVICE
1
2
3
4
5
6
7
8
9
10
11
12
13
14

IMAGING MASS SPECTROMETRY FOR SMALL MOLECULES IN TWO-DIMENSIONAL SAMPLES

PRIORITY INFORMATION

This patent application claims priority from German patent application 10 2007 024 857.3 filed May 29, 2007, which is hereby incorporated by reference.

FIELD OF THE INVENTION

The invention relates to spatially resolved mass spectrometric measurement and visualization of the distribution of small molecules in a mass range from approximately 150 to 500 Daltons, for example drugs and their metabolites, in thin sections or other two-dimensional samples, preferably with ionization of the molecules by matrix-assisted laser desorption.

BACKGROUND OF THE INVENTION

Imaging mass spectrometry of histologic thin tissue sections, or other two-dimensional samples, with ionization of the molecules of interest by matrix-assisted laser desorption (MALDI) has recently experienced an upsurge. The usual procedure is to measure the distributions of certain proteins, which, either alone or in combination with other proteins, can serve as biomarkers to characterize the stress or disease status of individual parts of the thin tissue section. A method of this type is described in U.S. Patent Publication 2006/0063145.

The prior art method requires the thin tissue section be coated with a layer of small matrix crystals in a special way, so that there is a high degree of ionization of the proteins and other substances of interest. A coating method of this type is described in German patent publication DE 10 2006 019 530.2.

Using specially shaped laser beam profiles, such as those described in U.S. Pat. No. 7,235,781, for example, it is possible to achieve spatial resolutions of approximately 50 micrometers when measuring molecular distributions in thin sections. This is sufficient for most applications. However, to obtain a good measurement with high sensitivity and a sufficiently high accuracy for the concentration measurement, it is not sufficient to scan an individual mass spectrum; between 50 and 500 individual spectra have to be added together to form a sum spectrum. In order to fully utilize the spatial resolution by using a measurement grid spacing of 50 micrometers, 40,000 sum spectra per square centimeter of thin section must be scanned, and these sum spectra must be assembled from several million individual spectra. It follows that the scanning time for an individual sum spectrum is crucial for the practicability of the method. Obviously, lower spatial resolutions can also be chosen. For body cross-sections of mice or rats, for example, very good distributions of the analyte substances over the individual organs and spaces between organs can be measured with grid spacings of between 200 and 500 micrometers. This only requires scanning of 2,500 and 400 sum spectra per square centimeter respectively. Nevertheless, these sum spectra can still include between a hundred thousand and a million individual spectra. Even in this case it is desirable to have a high scanning frequency with preferably more than 1,000 individual spectra per second.

Quite often interest is not, however, focused only on proteins and other macromolecules, but increasingly on the distribution of smaller molecules such as drugs or their metabolites in the tissue areas of the thin sections. The accumulation of drugs and their metabolites in certain organs or in certain kinds of tissue, for example tendons, connective tissues, nerves, muscle fibers and arterial or venous blood vessels, is of great interest when studying the effectiveness of these drugs. These small molecules generally have molecular weights roughly in the range 150-500 Daltons and thus lie within a mass range, which, in MALDI time-of-flight mass spectrometry, suffers such a high degree of interference from ions of complexes of the matrix substance and their fragments that good detection sensitivity cannot be achieved. Every single mass on the mass scale is already occupied by several different species of complex ions, thus creating a strong chemical background noise, which interferes with, or even prevents, any sensitive measurement of small molecules.

One solution to this dilemma is to measure a selected daughter ion from the fragmentation of the molecular ions of this small molecule, rather than the molecular ions themselves. These methods, which serve to improve the signal-to-noise ratio and also to increase the specificity of the determination, are already familiar in other fields of mass spectrometry under the abbreviation SRM (selective reaction monitoring). Modern tandem time-of-flight mass spectrometers such as those described in U.S. Pat. No. 6,300,627 are available to measure the daughter ions. These tandem time-of-flight mass spectrometers comprise two time-of-flight mass spectrometers in sequence, and are generically referred to by the abbreviation "TOF-TOF". The first time-of-flight mass spectrometer is used to select the parent ions; the second one measures the daughter ions resulting from the fragmentation of the parent ions. The fragmentation can be brought about by using a slightly stronger laser irradiation during the MALDI process, thereby creating metastable ions, which decompose in flight, or the fragmentation may be generated by collisions in gas-filled collision chambers.

Instead of using TOF-TOF-instruments, the daughter ions can also be measured with an instrument which uses the MALDI process for ion generation, then generates the daughter ions from the analyte ions by collision processes and detects them in a time-of-flight mass spectrometer with orthogonal ion injection. These instruments are, however, similarly expensive to tandem time-of-flight mass spectrometers.

Tandem time-of-flight mass spectrometers (TOF-TOF) have almost completely superseded the earlier customary method of measuring daughter ions in simple time-of-flight mass spectrometers with reflectors, which became known as "PSD" (post source decay), because they offer a significantly improved mass resolution, better substance utilization and far easier operation. Although it was possible to obtain the PSD spectra using relatively low-cost reflector time-of-flight mass spectrometers, they had to be compiled from 12 to 15 partial spectra, each of which had to be obtained individually by a new ionization of sample, using methods which were complicated to control. But modern tandem time-of-flight mass spectrometers also have disadvantages. They are relatively expensive and, for electronic reasons, cannot yet offer a high scanning frequency for the measurement of daughter ions.

SUMMARY OF THE INVENTION

The distribution of a selected species of small analyte molecules in a two-dimensional sample is measured using a time-of-flight mass spectrometer with reflector using the steps: (a) at least some of the analyte molecules from one point on the sample are ionized and the molecular ions are accelerated to form an ion beam; (b) at least some of the molecular ions are made to decompose into daughter ions during their flight, for example, by metastable decay or by collisions with gas in a collision cell; (c) the molecular ions of interest and their daughter ions, having the same flight velocities, are selected by an ion selector which deflects all other ions; (d) one or a few selected species of daughter ion are deflected by the reflector onto the detector by a preset voltage at the reflector, and measured at the detector in the form of a short daughter ion spectrum: Steps (a) to (d) are repeated at the same point on the sample and the daughter ion spectra of this location are combined to form sum spectra: Steps (a) to (e) are repeated at different points on the sample to measure the spatial distribution of the analyte ions; and in step (g) the signal strengths of the daughter ions, and thus the relative concentrations of the analyte ions at the individual locations on the sample, are obtained from the sum spectra.

The term "small molecules" here denotes molecules of substances with molecular weights below about 1,000 daltons; in its stricter sense, with molecular weights between approximately 150 and 500 daltons. As those skilled in the art know, the expression "small molecules" denotes a specialized field of mass spectrometry which is currently enjoying a revival and which is increasingly being given its own sessions at specialized conferences.

Selection in the ion selector essentially means that only the selected ions are transmitted unhindered and all other ions are deflected in such a way that they are no longer able to reach the detection point. The selection naturally does not refer to the mass, but to the velocity of the ions, so that all daughter ions from earlier fragmentations are also transmitted unhindered.

The two-dimensional samples are preferably histologic thin tissue sections, but plates for thin-layer chromatography, acrylic gels for one or two-dimensional gel electrophoresis, or other samples with distribution of the analyte molecules on or in a surface can be analyzed in a similar way. The analyte molecules are preferably ionized by matrix-assisted laser desorption, but other methods of ionizing substances from surfaces, such as simple laser desorption (LD), nanowire-assisted laser desorption (NALDI) or secondary ion mass spectrometry (SIMS), may also be used. Matrix-assisted laser desorption requires that a layer of small matrix crystals be applied and that these small matrix crystals crystallize relatively slowly out of the droplets of the matrix solution which has been applied so that the solvent can extract the analyte ions from the two-dimensional sample and embed them into the small matrix crystals during crystallization. Such a layer of small matrix crystals can be coated with a thin layer of metal, particularly a layer of gold, so that the layer does not exhibit charge phenomena, even at a high scanning repetition rate.

It is favorable if the acceleration of the molecular ions is delayed with respect to the desorption time of the laser pulse, not only because, as is well-known, this increases the mass resolution of the time-of-flight mass spectrometer, but also because it brings about a temporal focusing of the ions of one species at one location in the time-of-flight mass spectrometer. The ions which pass through this location with temporal focus are then focused onto the detector by the velocity-focusing reflector. If the ion selector for the molecular ions is placed at exactly the location of the temporal focus of the delayed acceleration, its resolution for the ion selection is increased. Incidentally, the decomposition of the molecular ions to daughter ions can occur in front of the ion selector as well as behind it, because the ion selector selects ions of the same velocity. The decomposition has hardly any effect on the velocity of the ions and therefore the daughter ions already created in front of the ion selector are selected as well. The decomposition of the molecular ions to daughter ions can thus already be induced by a slightly increased laser irradiation during the matrix-assisted laser desorption. This laser irradiation, particularly if the irradiated energy density is increased, produces a high proportion of metastable ions, which decompose with a half-life of a few microseconds and thus produce daughter ions. Alternatively, the decomposition can also be brought about by collision-induced decomposition in a gas-filled collision chamber.

The earlier method, known as PSD, was infamous for its poor mass resolution in the daughter ion spectra, its low sensitivity and slow operation. The way of using the reflector described in step (d) resembles this old method. Thus, even for those skilled in the art, it is surprising to learn that, if the electrical parameters of the time-of-flight mass spectrometer are favorably set, a mass resolution and sensitivity are obtained in the daughter ion spectrum, at the point where the daughter ion is to be detected, which are in no way inferior to modern tandem time-of-flight mass spectrometers and even surpass them. A method according to an aspect of the invention not only has the advantage of using of a lower-cost instrument, but, compared to modern tandem time-of-flight mass spectrometers, it has the further advantage that it can be set to a high scanning frequency of approximately two kilohertz more easily and with much less electronic wear, because only moderately high voltages have to be switched at this frequency. Thus, when the number of individual spectra per sum spectrum is not too high, it is quite feasible to scan more than ten sum spectra per second for the daughter ion measurement. A square centimeter of thin section can then be scanned, at full utilization of the spatial resolution, with measurement of 40,000 sum spectra in only about an hour, whereas a tandem time-of-flight mass spectrometer would take approximately ten hours.

Incidentally, the most important step for favorable adjustment of the reflector voltage in step (d) includes reducing the reflector voltage to the extent that the selected daughter ion follows approximately the same trajectory in the reflector as the analyte ion would at full reflector voltage.

It is expedient to scan the sample surface by moving the sample, which is affixed to a movable holder.

It is sometimes particularly important not only to measure the distribution of a single small analyte molecule, but also to be able to compare the distributions of a number of small analyte molecules with each other. A drug and one of its first reaction stages in the body, for example, one of its metabolites, may serve as an example. The two analyte molecules, i.e., the drug and its reaction product, generally have two masses not far distant from each other. The daughter ions to be selected will also have very similar masses; it is even possible that the same daughter ion can be selected. By opening the ion selector twice, or once for a longer period, the two analyte ions for the generation of a single daughter ion spectrum can be selected. The daughter ions of both analyte ions are measured in the same daughter ion spectrum with a slight delay, even if the two daughter ions have the same mass. With this slightly amended method, both distributions can thus be measured at the same time in direct comparison without lengthening the measurement time.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 1 is a block diagram illustration of a MALDI time-of-flight mass spectrometer with a reflector and a parent ion selector.

DETAILED DESCRIPTION

A first embodiment refers to the measurement of the spatial distribution of a single species of molecule in a thin histologic section with ionization of the analyte molecules by matrix-assisted laser desorption (MALDI). The spatial distribution of this selected species of small analyte molecule on the two-dimensional sample is measured with a MALDI time-of-flight mass spectrometer with reflector, as is illustrated in FIG. 1. A pulsed laser 3 should preferably be able to operate at a frequency of approximately two kilohertz. The sample is located on a sample plate 1, which can be moved in the plane of the sample, i.e., in two dimensions, by a movement device 2 with a high lateral accuracy of only a few micrometers.

The thin tissue sections are obtained in the usual way from frozen tissue using a cryomicrotome. They are usually around 20 micrometers thick. For the mass spectrometric analysis, they are placed on specimen slides, where they are adhesively affixed. The surface of the specimen slides is made conductive in the familiar way to provide a well-defined potential for the subsequent acceleration of the ions. As is usual in imaging MALDI mass spectrometry, the thin section is coated with a layer of matrix substance in order that the analyte molecules can be ionized by matrix-assisted laser desorption. The specimen slides are then affixed to the sample plates. They form a complete unit with the sample plate 1 and are introduced into the ion source of the mass spectrometer together with the sample plate 1.

Flashes of light from the laser 3 are focused by a lens 4 and directed by a mirror 5 onto a location 6 of the sample on the sample plate 1, causing analyte molecules at this location 6 of the sample to be desorbed and ionized. The flashes may have durations of between 100 pico-seconds and 10 nanoseconds; their profile can be shaped in a particular way, as described above. The laser energy density is chosen so as to be high enough to obtain a high proportion of metastable molecular ions, in particular with a short half-life of decomposition of only of few tens of microseconds. They therefore decompose to a large degree in the flight path to the reflector 13 of the time-of-flight mass spectrometer. Voltages on acceleration diaphragms 7 and 8 cause the ions to be accelerated to an ion beam 9. The voltage on the acceleration diaphragm 7 is switched in such a way that the acceleration starts only after the laser desorption; this adjustable time delay is between 50 and 500 nanoseconds approximately; this allows the analyte ions of the desorbed plasma cloud (and the daughter ions formed up to that point) to be temporally focused onto the parent ion selector 10. With MALDI time-of-flight mass spectrometers, this method is widely known as "delayed extraction" (DE).

The parent ion selector 10 is configured so that it opens only for a short time and otherwise laterally deflects all other ions which do not have the velocity of the selected species of small analyte molecule onto path 12 so that they can no longer reach detector 14. Only the selected analyte ions and their daughter ions formed by decomposition remain unhindered on their path 11 to the reflector 13. The daughter ions essentially have the same velocity as their parent ions as they suffer hardly any velocity change during decomposition and are selected together with their parent ions.

Two voltages are usually applied to the reflector 13: a deceleration voltage and a reflection voltage. A single voltage or more than two voltages is/are used only in exceptional circumstances. By setting the deceleration and reflection voltages on the reflector 13, a selected species of daughter ion can be directed onto the detector 14. An important step for a favorable adjustment of the reflector voltages includes reducing the applied reflector voltages to the extent that the selected daughter ion follows the same trajectory in the reflector as the molecular analyte ion would have at full reflector voltage. The required voltage reductions on the reflector may be calculated automatically from the two mass values of the selected daughter ion and molecular analyte ion. The reduction is strictly proportional to the ratio of the two masses, because the masses correspond to the energies of these two ions, and is proportional to both reflector voltages. The reflector causes ions of reduced energy to follow identical trajectories if its voltages are reduced in the same ratio as the energy. This setting achieves an increase in sensitivity, especially when the reflector produces a solid angle focusing by virtue of a special shaping of the electric field in the rear part, as is described in U.S. Pat. No. 6,740,872. The selected species of daughter ion is then focused onto the detector 14 in its entirety and without losses.

The heavier ions of the analyte molecules exit through the rear of the reflector 13 and do not disturb the subsequent progression of the measurement. The back of the reflector is often terminated with a grid and is equipped with a further detector to measure the ions exiting at this location. The signal of the analyte ions and the accompanying complex ions leaving the reflector at the back can possibly be used for normalizing purposes, for example, to correct the relative concentration measurements due to decreasing laser energy density.

The detector 14 acquires a short mass spectrum around the selected species of daughter ion. The ion current is amplified and digitized in the usual way. An excellent mass resolution for the selected species of daughter ion can be achieved by using optimum settings of the time delay of the acceleration, the accelerating voltage between the sample plate 1 and the acceleration diaphragm 7 and the deceleration and reflection voltages on the reflector 13. This is surprising even for those skilled in the art, because the PSD method on which it is based is infamous for having only a very moderate mass resolution and a moderate sensitivity. The poor reputation of the PSD method for the measurement of daughter ion spectra tends to keep those skilled in the art from using parts of this method. The surprisingly good mass resolution, however, means the signal-to-noise ratio increases and hence so does the sensitivity of the method as well. The above-mentioned adjustment of the reflector voltages and the good spatial focusing of the daughter ions onto the detector 13 which is thus produced means there is good utilization of the daughter ions and therefore optimum sensitivity as well. This method can be used to measure the spatial distributions for small molecules even if the actual signal of the molecular ions of the analyte substance no longer stands out from the background noise.

The background noise includes many complex ion species formed from the matrix substance, particularly when the laser energy density is increased. Matrix ions themselves, their polymers, their fragment ions and particularly complexes containing all these ions, are involved. The number of different types of ions is so great that several such ionic species can be detected at every mass. Since some of these ions also suffer ion-optical interferences, for example due to collisions, a random background noise, which cannot be mass resolved, is superimposed on the mass signals of the background. The daughter ion spectrum, in contrast, has only a small chemical background, which should nevertheless be checked before the imaging analytical method is set up to prevent one of the matrix complex ions admitted by the parent ion selector from accidentally producing decomposition ions which are located at the position of the selected daughter ions of the analyte molecules.

It is generally not sufficient to take a single measurement of a spectrum segment about the daughter ions. This measurement needs to be repeated at the same location approximately 50 to 500 times in order to obtain a signal with good reproducibility and sufficient sensitivity. The sample plate is not moved during this time. The digitized spectra from this location of the sample are added together and thus result in a usable sum spectrum; the signal strength of the daughter ions in the sum spectrum corresponds to the concentration of the selected small molecular substance at this location of the sample relative to concentrations elsewhere. The accuracy of the relative concentration measurement depends on the concentration of the substance itself, but also on the number of individual spectra in the sum spectrum. The sensitivity of the method and the accuracy of the relative concentration measurement can thus be adjusted by choosing the number of individual spectra in the sum spectrum.

This measurement of the sum spectrum of the daughter ions of the small molecule species of interest is repeated at different locations on the sample until a graph of the spatial distribution of the concentrations can be produced from the measurements. Commercial time-of-flight mass spectrometers with reflectors generally already have sufficiently fast and sufficiently accurate movement devices for the sample plate. It is practical to scan the sample surface by moving the sample plate. Any method can be used to select the location of the next measurement. For example, the next measurement point can be far removed from the current measurement point to avoid interferences caused by electrical charges. A disadvantage of this method, however, is that the sample plate has to be moved over large distances. These movements require time. It is therefore often more favorable to scan in a close grid from one point to the neighboring point. The sample can be prevented from charging up in the familiar way by vapor-depositing a very thin layer of gold onto the layer of small matrix crystals in a vacuum apparatus. This layer of gold is itself sufficient to improve the single mass spectrum. The layer of gold is not completely closed when it is examined under a microscope, but it satisfactorily discharges all surface charging.

The sum spectra of every location can immediately be retrieved from the acquisition electronics and analyzed with respect to the signal strength of the daughter ion by a linked computer. If the detection method for the daughter ions has a sufficiently high degree of certainty, it is possible to save only the signal strengths of the daughter ion for the various spatial coordinates and to use them for the subsequent graphic representation of the distribution. To save memory, thousands of sum spectra can then be discarded if the licensing regulations for drugs or similar regulations allow. Commercial software is available for the graphic representation of the spatial distributions. Images of microscopically obtained stained neighboring thin sections can be superimposed on the graphs of the distributions to visualize the location of organs.

The spatial resolution can be selected via the grid spacing of the measurements, provided it is above the limiting resolution given by the lateral diffusion of analyte substances as the matrix layer is applied. At full utilization of the spatial resolution resulting from the application of the matrix, the grid points for the measurement are only 50 micrometers apart. 40,000 measuring points per square centimeter are then scanned. If a scanning frequency of two kilohertz can be achieved, and if 200 individual spectra per sum spectrum are necessary for the measurement point, for example, the scanning of one square centimeter takes only slightly longer than an hour, whereas modern tandem time-of-flight mass spectrometers need approximately ten hours for this task.

The maximum possible spatial resolution is often not required, however. An example of this is given below. Olanzapine has a molecular weight of 313 daltons and is investigated for its suitability as a drug for the treatment of schizophrenic disorders. If olanzapine is fed to a rat orally at a dose of 8 mg/kg and the rat is killed after two hours, the daughter ion of olanzapine with a mass of 256 daltons can easily be detected in the thin section with 400 individual spectra per sum spectrum. A grid spacing of 400 micrometers is sufficient for a cross section of a rat belly measuring two by six centimeters. For the 400 individual spectra per sum spectrum, which are favorable in this case, at least 4 sum spectra per second can easily be acquired, thus allowing all twelve square centimeters of the distribution graph to be measured in approximately 30 minutes. In such a distribution image, the distribution of the olanzapine is easily detected and it can be seen to accumulate particularly in spaces between individual organs. A study of this type requires that several thin sections of rats be produced after different exposure times and it is therefore essential for such a distribution measurement that the measuring time is of an acceptable duration. Additionally, the distributions of some metabolites must also be measured in order to investigate the breakdown pathways and possible sites of action of these metabolites.

Mass spectrometric measurement has major advantages compared to the methods previously used. Until now, the distribution of olanzapine has been measured by radioactive marking of the olanzapine. But the distributions of the original olanzapine molecule cannot then be separated from those of its metabolites because the metabolites generally also bear the radioactive marker. Mass spectrometry alone is able to record the different distributions of the original molecules and the various metabolites.

An advantage of a method according to the invention is that it preferably uses conventional and low-cost time-of-flight mass spectrometers with reflectors and is able to achieve high acquisition rates. These time-of-flight mass spectrometers are usually already equipped with parent ion selectors to permit occasional scanning of PSD spectra. To utilize the high scan speed to the full, however, they need to be equipped with correspondingly fast lasers and, of course, with appropriate software to control the method. The desired high laser pulse rate of two kilohertz can be only achieved at present with solid-state lasers, not with the nitrogen lasers which have been preferred for MALDI until now. As has been mentioned above, solid-state lasers require special beam shaping to achieve highly efficient ionization of the analyte molecules. The solid-state lasers used can be neodymium-YAG lasers with a tripling of the quantum energy, for example.

Apart from thin histologic tissue sections, other two-dimensional samples are also suitable for the measurement of distributions of small molecules. It is also possible to measure the distributions of molecules in plates for thin-layer chromatography, or in acrylic gels for one- or two-dimensional gel electrophoresis, for example. Measurement of the distribution of organic impurities on the surface of electronic components is also of interest, for example. As a general rule, distributions of analyte molecules on or in any surface can be analyzed, if the ions of these analyte molecules can be made metastable or can be fragmented by collisions with gas molecules.

The ionization of the analyte molecules at individual locations of the sample is preferably undertaken by matrix-assisted laser desorption, but other methods of ionization of the substances are also suitable, for example simple laser desorption (LD), secondary ion mass spectrometry (SIMS) or the bombardment of the sample with minute charged droplets, which also ionizes surface molecules. Laser desorption (LD) and matrix-assisted laser desorption (MALDI) generate many metastable analyte ions which decay during their flight to the reflector. Depending on the method of ionization, other fragmentation methods apart from laser induced fragmentation can also be used. The decomposition can, for example, be produced by collision-induced fragmentation brought about by injecting the molecular ions into a gas-filled collision chamber.

Compared to methods which use modern tandem time-of-flight mass spectrometers, a method according to the invention has the advantage that it can be set to high scanning frequencies of approximately two kilohertz more easily and with much less electronic wear, because only moderately high voltages have to be switched at this frequency. The switching of the voltage refers to the voltage of the acceleration diaphragm 7, which only needs to be switched by a few hundred volts (up to a maximum of approximately two kilovolts). When used in conjunction with a fast pulsed laser, acquisition rates for single spectra of approximately two kilohertz can be achieved and therefore at least ten sum spectra per second, each with 200 individual spectra, are possible for the daughter ion measurement.

It is sometimes particularly important not only to measure the distribution of one small analyte molecule, but also to be able to compare the distributions of a number of small analyte molecules with each other. This relates, in particular, to the distributions of drugs and their metabolites which are produced in the body. The molecules of the drugs are immediately attacked and modified by enzymes in the body. Somewhat heavier reaction products can thus be produced, for example by oxidation, or lighter reaction products, for example by the splitting off of methyl, amino or hydroxyl groups. The first reaction stages of enzymatic attacks often have molecular weights which differ only slightly from those of the original molecules. Of therapeutic importance is the fact that it is often not the molecules of the original substance which develop the therapeutic effects, but the molecules of their metabolites; it is therefore particularly important to measure their spatial distributions. The distributions often do not coincide with those of the original substances; for example, quite different spatial distributions can be obtained by a change in the hydrophilic/hydrophobic properties, and also by other transport or retention mechanisms.

For the comparative measurement of two (or more) spatial distributions, a particularly favorable method can be used which results from a slight modification to an aspect of the invention. The two analyte molecules, i.e., the molecular ions of the drug and the molecular ions of the metabolic reaction product, are admitted together, one behind the other, into the flight path to the reflector by opening the parent ion selector twice; and two daughter ions of these two species of original molecule with similar masses are selected. These two daughter ions are measured together in a single daughter ion spectrum by being reflected onto the detector. Even if two daughter ions of the same mass have been selected, which could often be the case with metabolites, the daughter ions of the two metabolites appear in the daughter ion spectrum with a slight separation, because their parent ions had different flight times to the parent ion selector due to their different masses and also because the two daughter ions have slightly different energies. This is also the case for those daughter ions which are produced by the splitting off of the same group from the two analyte ions; here, also, the two daughter ions are measured at slightly different locations in the daughter ion spectrum.

If the masses of the two analyte ions are close together, the parent ion selector can also be held open for a short period of time to admit both analyte ions.

In this case as well, a favorable setting of the reflector voltages may allow one of the two daughter ions to fly roughly along the trajectory which would have been taken by the analyte ion at full reflector voltages. It can, however, also be favorable to choose reflector voltages where both daughter ions fly along trajectories as close as possible to this one.

This slightly modified method can be used to measure the two spatial distributions of drug molecules and metabolites together and in direct comparison without increasing the duration of the measurement. It is also possible to compare the distributions of different types of metabolite. The method can also be extended to more than two analyte ions although, in this case, it is possible that the signal-to-noise ratio must be improved by increasing the number of individual spectra per sum spectrum.

Using the knowledge of this invention with its surprising advantages, a person skilled in the art of mass spectrometry can easily undertake further adaptations of methods according to the invention. These further adaptations shall also be subject to the protection rights under this patent application.

Although the present invention has been illustrated and described with respect to several preferred embodiments thereof, various changes, omissions and additions to the form and detail thereof, may be made therein, without departing from the spirit and scope of the invention.

What is claimed is:

1. A method for measuring spatial distribution of a single species of analyte molecules on or in a two-dimensional sample in a time-of-flight mass spectrometer with a reflector and a detector, the method comprising:

(a) ionizing at least some of the analyte molecules from one point on the sample to provide molecular ions, and accelerating the molecular ions;

(b) decomposing at least some of the molecular ions into daughter ions;

(c) selecting a species of the molecular ions of the single species of analyte molecules and corresponding daughter ions of the selected molecular ions with an ion selector, wherein the molecular weight of the selected molecular ions is below 1000 Daltons, and directing substantially all of the selected species of the molecular ions and the corresponding daughter ions from the ion selector to the reflector wherein the selected species of the molecular ions and the corresponding daughter ions are not substantially accelerated between the ion selector and the reflector;

(d) adjusting the reflector to a voltage setting that is optimal for one selected species of the corresponding daughter ions, and directing the selected species of daughter ions onto the detector, and measuring a daughter ion single spectrum of the selected species of daughter ions at the detector;

(e) repeating steps (a) to (d) at the same point on the sample, and combining the daughter ion single spectra of this location to form a sum spectrum;

(f) repeating steps (a) to (e) at different points on the sample; and (g) measuring the spatial distribution of the single species of analyte molecules by obtaining signal strengths of the one selected species of daughter ions at the individual locations on the sample from the sum spectra.

2. The method of claim 1, wherein the two-dimensional sample is a histologic thin tissue section.

3. The method of claim 2, wherein the analyte molecules are ionized by matrix-assisted laser desorption.

4. The method of claim 3, wherein the two-dimensional sample is coated with a layer of small matrix crystals before the mass spectrometric measurement, the small matrix crystals having to crystallize out from the droplets of the matrix solution which has been applied.

5. The method of claim 4, wherein the layer of small matrix crystals is coated with a thin layer of metal.

6. The method of claim 1, wherein the acceleration of the molecular ions is delayed with respect to a laser desorption pulse associated with the step of ionizing by matrix-assisted laser desorption, thus achieving a temporal focusing of the ions of one species at a distinct location of the time-of-flight mass spectrometer.

7. The method of claim 6, wherein the step of selecting the molecular ions and their daughter ions includes positioning the ion selector at the location of the temporal focus of the delayed acceleration of the molecular ions.

8. The method of claim 7, wherein the step of ionizing produces metastable molecular ions, and the decomposition of the molecular ions to daughter ions is optimized by adjustment parameters of the laser desorption.

9. The method of claim 1, wherein the decomposition of the molecular ions comprises collision-induced decomposition in a gas-filled collision chamber.

10. The method of claim 1, wherein electrically adjustable parameters of the time-of-flight mass spectrometer, including the reflector voltage, are set to a maximum resolution and/or sensitivity in the daughter ion spectrum at the location where the selected species of daughter ion is to be detected.

11. The method of claim 1, wherein the steps (a) to (e) are repeated at different points on the sample by moving the sample.

12. The method of claim 1, wherein the adjustment of the reflector voltage at step (d) comprises reducing the applied reflector voltage to a value at which the selected species of daughter ion flies along roughly the same trajectory as is taken by the selected molecular ion at full reflector voltage.

13. The method of claim 12, wherein the reduction of the reflector voltages is determined from the masses of the selected molecular ion and the selected daughter ion.

14. A method for the measurement the spatial distribution of analyte molecules on or in a two-dimensional sample in a time-of-flight mass spectrometer with a reflector and a detector comprising the following steps:

(a) ionizing at least some of the analyte molecules from a point on the sample to provide molecular ions, and accelerating the molecular ions;

(b) decomposing at least some of the molecular ions to into daughter ions;

(c) selecting a species of the molecular ions of the single species of analyte molecules and corresponding daughter ions of the selected molecular ions with an ion selector, wherein the molecular weight of the selected molecular ions is below 1000 daltons and substantially all of the selected species of the molecular ions and the corresponding daughter ions are directed from the ion selector to the reflector where the selected species of the molecular ions and the corresponding daughter ions are not substantially accelerated between the ion selector and the reflector, (d) adjusting the reflector to a voltage setting for a selected species of the corresponding daughter ions, and directing the selected species of daughter ions onto the detector, and measuring a daughter ion single spectrum of the selected species of daughter ions at the detector;

(e) repeating steps (a) to (d) at the same point on the sample, and combining the daughter ion single spectra for this location to form a sum spectrum;

(f) repeating steps (a) to (e) for different points on the sample; and (g) measuring the spatial distribution of the selected analyte molecules by determining the signal strengths of the daughter ions in the sum spectrum at the individual locations on the sample.

15. The method of claim 14, wherein the adjustment of the reflector voltage in step (d) comprises reducing the applied reflector voltage to a value where one of the selected daughter ions flies along roughly the same trajectory as their corresponding molecular ion traverses at full reflector voltage.

16. The method of claim 1, further comprising selecting the reflector voltage such that the selected molecular ions pass through the reflector in a direction away from the detector.

17. The method of claim 14, wherein the decomposition of the molecular ions takes place after the acceleration and prior to the selection in the ion selector.

18. The method of claim 14, wherein the decomposition of the molecular ions takes place after the ion selector and prior to the reflector.

19. The method of claim 1 or claim 14, wherein the mass of the selected molecular ions is between 100 and 500 Daltons.

* * * * *